March 20, 1934.    E. W. N. BOOSEY    1,951,645
CLEAN-OUT PLUG
Filed Nov. 17, 1930
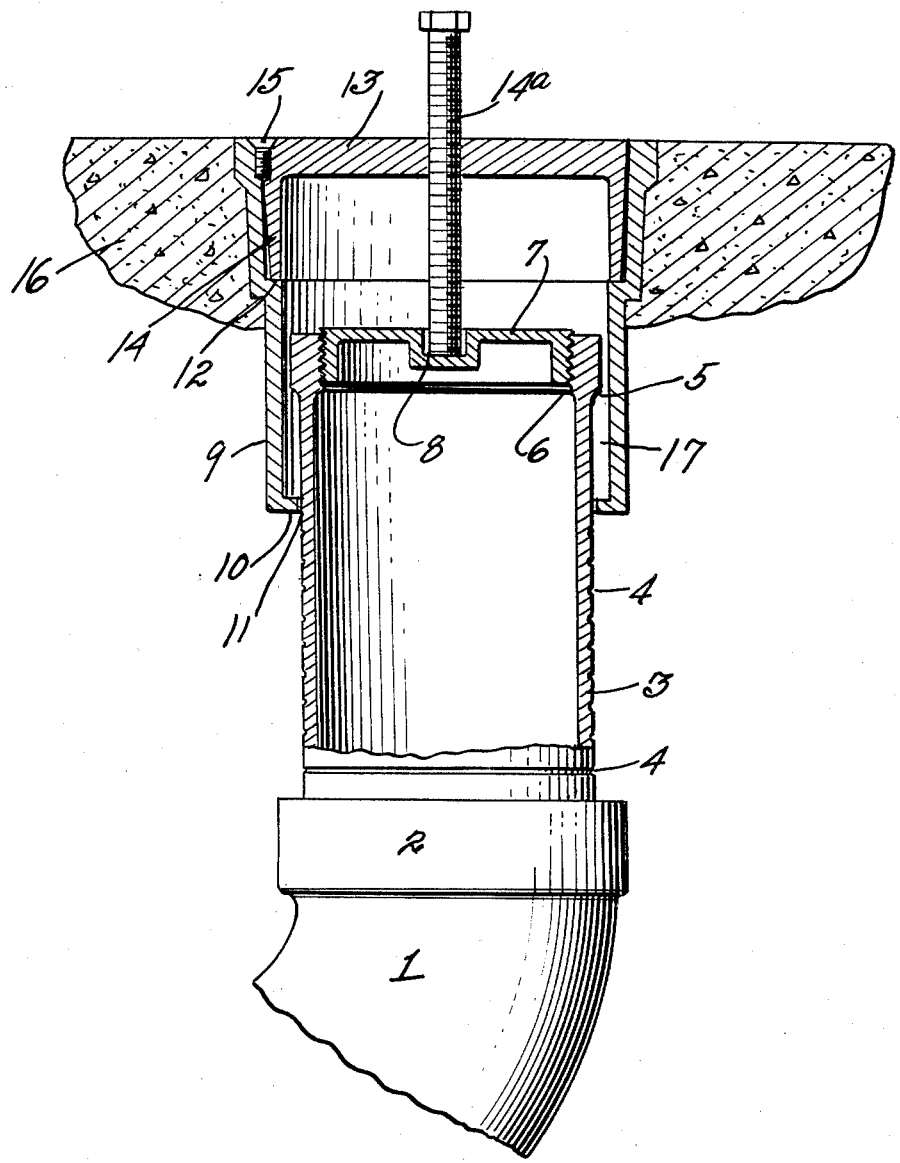
INVENTOR.
EDWARD W. N. BOOSEY
BY
ATTORNEY.

Patented Mar. 20, 1934

1,951,645

UNITED STATES PATENT OFFICE 1,951,645

CLEAN-OUT PLUG

Edward W. N. Boosey, Detroit, Mich.

Application November 17, 1930, Serial No. 496,132

3 Claims. (Cl. 137—76)

This invention relates to cleanout plugs for a plumbing element, conduits etc., and the object of the invention is to provide a cleanout plug through which access may be had to the interior of a conduit or other plumbing fitting that is adjustable in length whereby it may be varied in its height relative to a floor surface usually laid subsequent to the plumbing installation.

It is further an object of the invention to provide a cleanout plug for attachment to a plumbing element or a fitting comprising two tubular parts one of which has a sealing plug and the other of which is adjustable thereon and carrying a removable cover at the floor surface to provide access to the sealing plug.

It is further a primary object of the invention to provide a cleanout plug and cover therefor consisting of a conduit like portion for permanent attachment in a plumbing installation and having a removable plug for sealing the same and a member adjustable thereon including a cap adapted to be varied in height relative to the said first portion whereby the upper end thereof and cap may be brought to the desired relationship with the floor surface.

These and other objects and the various novel features of the invention are hereinafter more fully described and claimed, and the preferred form of construction of a cleanout plug embodying my invention is shown in the accompanying drawing which is an elevation partly in section showing my improved cleanout.

In the drawing 1 indicates a part of a plumbing conduit with which my improved cleanout plug is associated and it is to be understood that any portion of a conduit or plumbing fitting with which it is desired to provide a cleanout plug may be formed for association therewith.

The fitting is here shown as having a hub portion 2 in which is seated a tubular member 3 open at the end inserted in the hub or attached to the fitting 1. This tubular member may be circumferentially grooved as indicated at 4 to enable the same to be readily severed to shorten the length thereof. The grooves form no part of the present invention and is a common expedient in this art. So far as my invention is concerned, the tubular member 3 may be provided with the grooves or may be of any other desired form. The upper end of the member 3 is thickened providing an external flange 5 and an internal flange of sufficient depth to receive the threads 6 for the sealing plug 7 threaded therein. The sealing plug 7 is usually provided with a hexagonal socket for a wrench or may have a slot 8 thereacross or otherwise constructed to receive an instrument for assembling or disassembling the plug 7.

Associated with the member 3 is what I have termed a loose hub 9 having an internal lateral flange 10 and a central aperture 11 slightly greater in diameter than the diameter of the body of the member 3. This member 3 is to be inserted from the upper end of the hub it being understood that the lower end 3 of the member within the hub 2 of the plumbing conduit is less in external diameter than the general diameter of the aperture 11.

This loose hub portion which is tubular in form, is enlarged at its upper end to provide a shoulder 12 and the upper end is open to receive the cap or cover 13 which preferably has an external tapered wall 14 to prevent the same from rusting in place and permit ready removal. The cap 13 has a central threaded aperture for the screw 14a which may pass therethrough and into the recess 8 in which it has a bearing in the construction shown. The cap and the upper end of the member 9 each have a half circular recess both of which are threaded to receive a retaining screw 15. At the time this plug is assembled with the plumbing fitting the floor, which is partially indicated at 16 as being of concrete, has not been laid but the member 3 at the completion of the plumbing installation is in place as indicated and is caulked in place in the hub 2 with the form of construction shown or otherwise secured in a leak-proof relationship to the plumbing element. At the time the floor is laid and the level thereof is determined, the screw 14a is turned to the right or the left to raise or lower the member 9 to bring the surface of the cap and upper end of the said member 9 to the desired level usually flush with the floor surface. This is possible due to the cap member at this time being secured to the hub by the screw 15. Subsequent to the laying of the floor the screw 15 and the screw 14a are removed and thus the cap 13, which is flush with the floor surface, is readily removable as the aperture for the screw 14a permits introduction of a member to pick the cover from place. This permits access to the sealing plug 7 which may be removed in the usual manner to provide access to the interior of the plumbing fitting.

Subsequent to the laying of the floor and the hardening thereof the space 17 between the member 9 and the upper part of the member 3 is caulked to prevent seepage of fluid to between the two parts. The flange 5 on the upper end of the member 3 is greater in diameter than the aperture 11 and thus it is not possible in installing this device to raise the member 9 higher than the under edge of this member 5 with which the flange 10 would then engage.

The construction described is serviceable in the laying of a new floor or to readjust the device in the event the floor level is to be changed from its intended position after the plumbing installation has been completed. Also, in reconstruction of some portion of the floor, a variation in the position of the member 9 and cap 13 may be made or a new cleanout plug introduced and adjusted to compensate for the changed position in the floor level.

From the foregoing description it is believed evident that the various objects of the invention are attained by the construction described in which a removable cap is provided flush with the floor surface thus avoiding the unsightly projecting cleanout plugs commonly in use and permits ready accessibility for removal and subsequent introduction of the sealing plug for removing obstructions from the plumbing conduit with which the same is associated.

The structure comprising the elements 3, 7, 9, 13 and 14a has been termed a cleanout plug and the element 7 has been termed a sealing plug to distinguish the said sealing plug from the total assembly.

Having thus briefly described my invention, what I claim and desire to secure by Letters Patent of the United States is—

1. A cleanout plug for a plumbing element having an opening comprising, an open ended tubular member, one end of which is secured in sealed relation with the opening of the plumbing element and the opposite end thereof having an external flange greater in diameter than the diameter of the body thereof, a sealing plug for said flanged end of the tubular element, a second open ended tubular member having an internal flange at one end providing a central aperture thru which the first member may be inserted, the internal flange of the second tubular element and the external flange of the first named tubular element limiting movement of the second tubular element in one direction, said second tubular member having an internal peripheral shoulder adjacent the end opposite that through which the first tubular member is positioned, a cap member for said second tubular element of a cupped form and supported by the said shoulder of the second tubular member, means for securing the cap to the said second tubular member, and a screw in threaded relation with the cap extending therethrough to engagement with the sealing plug of the first tubular member providing a means for varying the position of the second tubular member longitudinally of the first tubular member.

2. A cleanout plug for a plumbing element having an opening comprising, an open ended tubular member adapted to have one end thereof secured in sealed relation with the said opening of the plumbing element, a sealing plug secured at the opposite end of the said tubular member, a second open ended tubular member slidable longitudinally externally of the first tubular member to provide for adjustment, and means for adjusting the said second tubular member relative to the first whereby the end of the second tubular member may be positioned in desired relationship with a floor or wall in which the plumbing element is positioned, and a closure member for the said end of the second tubular member.

3. A cleanout plug for a plumbing element having an opening comprising, an open ended tubular member, a sealing plug secured in one end thereof, a second open ended tubular member slidable thereon and within which the sealed end of the first tubular member is positioned, a cap member detachably secured to the outer end of the second tubular member, said cap member having a central threaded aperture, a screw in threaded relation therewith and projecting therethrough to engagement with the sealing plug and by rotation of which the position of the second tubular member relative to the first tubular member may be adjusted for the purpose described.

EDWARD W. N. BOOSEY.